US007261166B2

(12) United States Patent
Baber et al.

(10) Patent No.: US 7,261,166 B2
(45) Date of Patent: Aug. 28, 2007

(54) SWITCH FOR POWER TOOL

(75) Inventors: Brad M. Baber, Arlington Heights, IL (US); David Clarke, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 40 days.

(21) Appl. No.: 11/229,294

(22) Filed: Sep. 16, 2005

(65) Prior Publication Data

US 2007/0062715 A1 Mar. 22, 2007

(51) Int. Cl.
*B23C 1/20* (2006.01)

(52) U.S. Cl. ........................ 173/217; 173/20; 173/170; 200/43.17; 200/522; D8/61; 409/182

(58) Field of Classification Search ............. 200/43.17, 200/321, 332.2, 522, 334, 260, 290, 318; 173/170, 217, 20, 169; 409/182; D/61
See application file for complete search history.

(56) References Cited

U.S. PATENT DOCUMENTS

| | | | | |
|---|---|---|---|---|
| 1,751,781 A | | 3/1930 | Weiss | |
| 2,211,216 A | | 8/1940 | Oster | |
| 2,702,098 A | | 2/1955 | Staak | |
| 2,897,302 A | | 7/1959 | Godfrey et al. | |
| 3,381,104 A | * | 4/1968 | Abell et al. | 200/332.2 |
| 3,511,947 A | | 5/1970 | Eikermann et al. | |
| 3,533,655 A | | 10/1970 | Harley | |
| 3,767,876 A | | 10/1973 | Batson | |
| 3,872,951 A | | 3/1975 | Hastings, Jr. | |
| 3,899,852 A | | 8/1975 | Batson | |
| 4,006,333 A | * | 2/1977 | Hults | 200/437 |
| 4,045,650 A | * | 8/1977 | Nestor | 200/556 |
| 4,061,126 A | | 12/1977 | Schlangen | |
| 4,097,703 A | * | 6/1978 | Houser | 307/126 |
| 4,133,128 A | | 1/1979 | Brush | |
| 4,280,026 A | | 7/1981 | Alessio | |
| 4,489,525 A | | 12/1984 | Heck | |
| 4,520,256 A | | 5/1985 | Doyle | |
| 4,577,365 A | | 3/1986 | Yuen | |
| 4,577,367 A | | 3/1986 | Durand | |
| 4,667,119 A | * | 5/1987 | Holmes | 307/326 |
| 4,735,020 A | | 4/1988 | Schulz et al. | |
| 4,932,294 A | | 6/1990 | Chang | |
| 4,934,223 A | | 6/1990 | Wong | |
| 5,022,188 A | | 6/1991 | Borst | |

(Continued)

FOREIGN PATENT DOCUMENTS

WO WO 01/19228 A1 3/2001

OTHER PUBLICATIONS

US 6,385,032, 12/2004, Pozgay et al. (withdrawn)

*Primary Examiner*—Scott A. Smith
(74) *Attorney, Agent, or Firm*—Foley & Lardner LLP

(57) ABSTRACT

A power tool includes a housing having a motor provided therein and a switch provided within the housing for activating the motor. The power tool also includes a member configured for movement between a first position in which the motor is operating and a second position in which the motor is not operating. The member includes a first end retained in the housing at a first location, a second end retained in the housing at a second location, a body portion extending between the first end and the second end, and a beam extending from the body into the housing for selectively actuating the switch.

27 Claims, 7 Drawing Sheets

U.S. PATENT DOCUMENTS

| | | | | |
|---|---|---|---|---|
| 5,074,081 | A | 12/1991 | Beth et al. | |
| 5,098,235 | A | 3/1992 | Svetlik et al. | |
| 5,143,490 | A | 9/1992 | Kopras | |
| 5,161,679 | A * | 11/1992 | Russo | 200/43.17 |
| 5,191,968 | A | 3/1993 | McCurry | |
| 5,323,823 | A | 6/1994 | Kopras | |
| 5,346,342 | A | 9/1994 | Winchester | |
| 5,369,236 | A | 11/1994 | Nickels, Jr. | |
| 5,428,197 | A * | 6/1995 | McCurry et al. | 200/332.2 |
| 5,445,479 | A | 8/1995 | Hillinger | |
| 5,558,570 | A | 9/1996 | Nakamura et al. | |
| 5,810,525 | A | 9/1998 | Ector, Sr. | |
| 5,813,805 | A | 9/1998 | Kopras | |
| 5,819,913 | A | 10/1998 | Reiter | |
| 5,902,080 | A | 5/1999 | Kopras | |
| 6,048,260 | A | 4/2000 | Kopras | |
| 6,152,639 | A | 11/2000 | Hsu | |
| 6,169,258 | B1 | 1/2001 | Rodney et al. | |
| D439,122 | S | 3/2001 | Adler et al. | |
| D439,484 | S | 3/2001 | Adler et al. | |
| 6,196,093 | B1 | 3/2001 | Hu | |
| 6,327,781 | B1 | 12/2001 | Sinclair et al. | |
| 6,364,580 | B1 | 4/2002 | Dils et al. | |
| D458,333 | S | 6/2002 | Power | |
| 6,443,675 | B1 | 9/2002 | Kopras et al. | |
| 6,443,676 | B1 | 9/2002 | Kopras | |
| 6,454,427 | B1 | 9/2002 | Chen | |
| D465,393 | S | 11/2002 | Kopras et al. | |
| D465,712 | S | 11/2002 | Kopras et al. | |
| D466,775 | S | 12/2002 | Kopras et al. | |
| 6,488,451 | B1 | 12/2002 | Hartman | |
| D473,770 | S | 4/2003 | Kopras et al. | |
| 6,729,480 | B1 | 5/2004 | Blake | |
| 6,736,220 | B1 * | 5/2004 | Chan et al. | 173/170 |
| 6,754,935 | B2 | 6/2004 | Pozgay et al. | |
| 6,786,685 | B2 | 9/2004 | Schaub et al. | |
| 6,802,108 | B2 | 10/2004 | Haselby et al. | |
| 6,803,683 | B2 | 10/2004 | Bone et al. | |
| 6,812,425 | B1 * | 11/2004 | Wong | 200/522 |
| 6,814,157 | B2 | 11/2004 | Maras | |
| 6,854,938 | B2 | 2/2005 | Kopras et al. | |
| 6,880,281 | B1 | 4/2005 | Orr | |
| 6,886,643 | B2 | 5/2005 | Riley et al. | |
| 6,890,135 | B2 | 5/2005 | Kopras et al. | |
| 6,918,720 | B2 | 7/2005 | Kopras et al. | |
| 6,926,477 | B2 | 8/2005 | Allemann et al. | |
| 6,958,455 | B1 * | 10/2005 | Lui | 200/43.17 |
| 7,077,218 | B2 * | 7/2006 | Justis et al. | 173/217 |
| 7,112,751 | B2 * | 9/2006 | Turley | 200/50.32 |
| 2003/0088941 | A1 | 5/2003 | Rotondi | |
| 2004/0187322 | A2 | 9/2004 | Bednar et al. | |
| 2004/0191021 | A1 | 9/2004 | Breitenmoser | |
| 2004/0206649 | A1 | 10/2004 | Chen | |
| 2005/0081364 | A1 | 4/2005 | Kopras et al. | |
| 2005/0097759 | A1 | 5/2005 | Igarashi | |

* cited by examiner

SWITCH FOR POWER TOOL

BACKGROUND

The present invention relates generally to the field of power tools. More specifically, the present invention relates to hand-held power tools that include handles that may be selectively attached to and detached from the tools.

Hand-held power tools generally include a housing and a motor contained within the housing. The motor is configured to move a tool bit or other cutting accessory at high speeds to form cuts in a workpiece (e.g., a piece of wood, drywall, tile, etc.). For example, a hand-held rotary cutting tool such as that disclosed in U.S. Pat. Nos. 5,813,805 and 6,443,675 to Kopras et al. (the disclosures of which are incorporated by reference herein in their entirety) is configured to rotate a helical or spiral cutting tool bit that includes a sharp cutting edge wrapped in a helix around the longitudinal axis of the bit. According to this example, the tool is configured to allow the formation of cuts in a workpiece by moving the tool in a direction perpendicular to the axis of rotation of the bit (i.e., the tool is arranged normal to the workpiece surface and moved parallel to the surface of the workpiece to allow the edges of the bit to remove material from the workpiece).

Power tools such as rotary cutting tools generally include mechanisms such as switches and the like for turning the motor of the power tool on and off. Such switches may be provided in various locations on the power tool. However, such known mechanisms do not realize certain advantageous features or combinations of features as may be desirable for a user of the power tool and/or for a manufacturer of such tools. For example, certain tools may include switches which do not provide feedback to a user of the tool as to the proper position of the switch (e.g., there is no positive feedback to the user to let the user know that the switch is in the "on" position, etc.).

It would be advantageous to provide an improved mechanism for turning on and switching off power for a power tool. It would also be advantageous to provide such a mechanism that is relatively easy to assemble and that may be utilized in a battery-powered tool. It would be desirable to provide a power tool having any one or more of these or other advantageous features as may be apparent to those reviewing this disclosure.

SUMMARY

An exemplary embodiment of the invention relates to a power tool includes a housing having a motor provided therein and a switch provided within the housing for activating the motor. The power tool also includes a member configured for movement between a first position in which the motor is operating and a second position in which the motor is not operating. The member includes a first end retained in the housing at a first location, a second end retained in the housing at a second location, a body portion extending between the first end and the second end, and a beam extending from the body into the housing for selectively actuating the switch.

Another exemplary embodiment of the invention relates to a power tool having a switch cap for actuating a switch provided within a housing of a power tool. The switch cap includes a first end portion, a second end portion, a center portion, and means for engaging a switch provided within the power tool extending from the center portion. The first end portion and the second end portion each include a first arm and a second arm, the first arm including means for preventing the switch cap from being removed from the power tool and the second arm including means for providing feedback regarding the position of the switch cap Another exemplary embodiment of the invention relates to a power tool including a housing having a motor provided therein and a battery for providing power to the motor. The power tool also includes a system for activating the motor including a switch provided within the housing and a member for actuating the switch. The member includes a body portion, an element extending from the body portion for actuating the switch, a first end, and a second end. Each of the first end and the second end include a first arm and a second arm, the first arm including a feature for preventing the switch cap from being removed from the power tool and the second arm including a feature for providing feedback regarding the position of the switch cap.

DETAILED DESCRIPTION OF EXEMPLARY EMBODIMENTS

Figure 1:
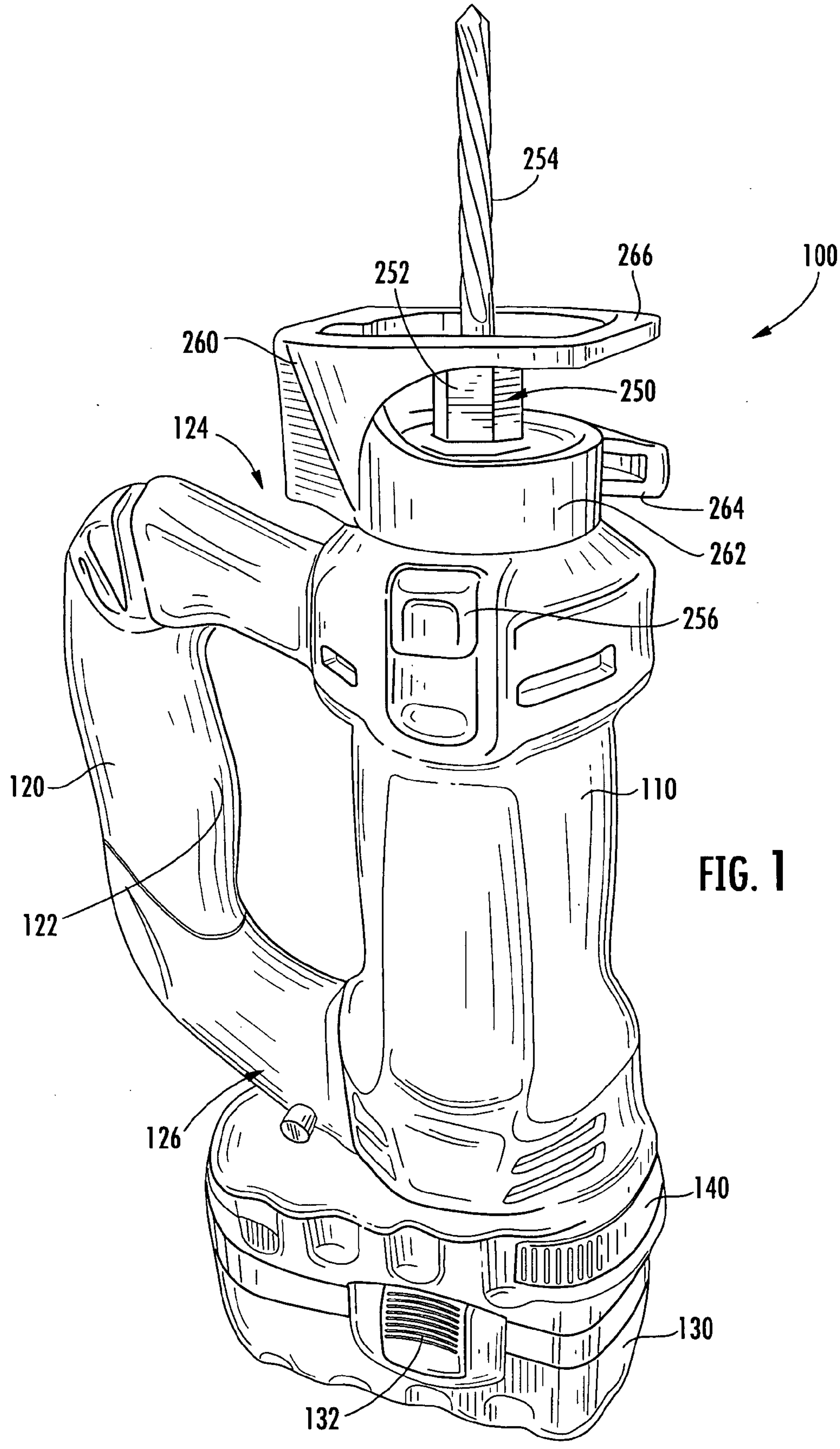
FIG. 1 is a perspective view of a hand-held power tool according to an exemplary embodiment.
Figure 2:
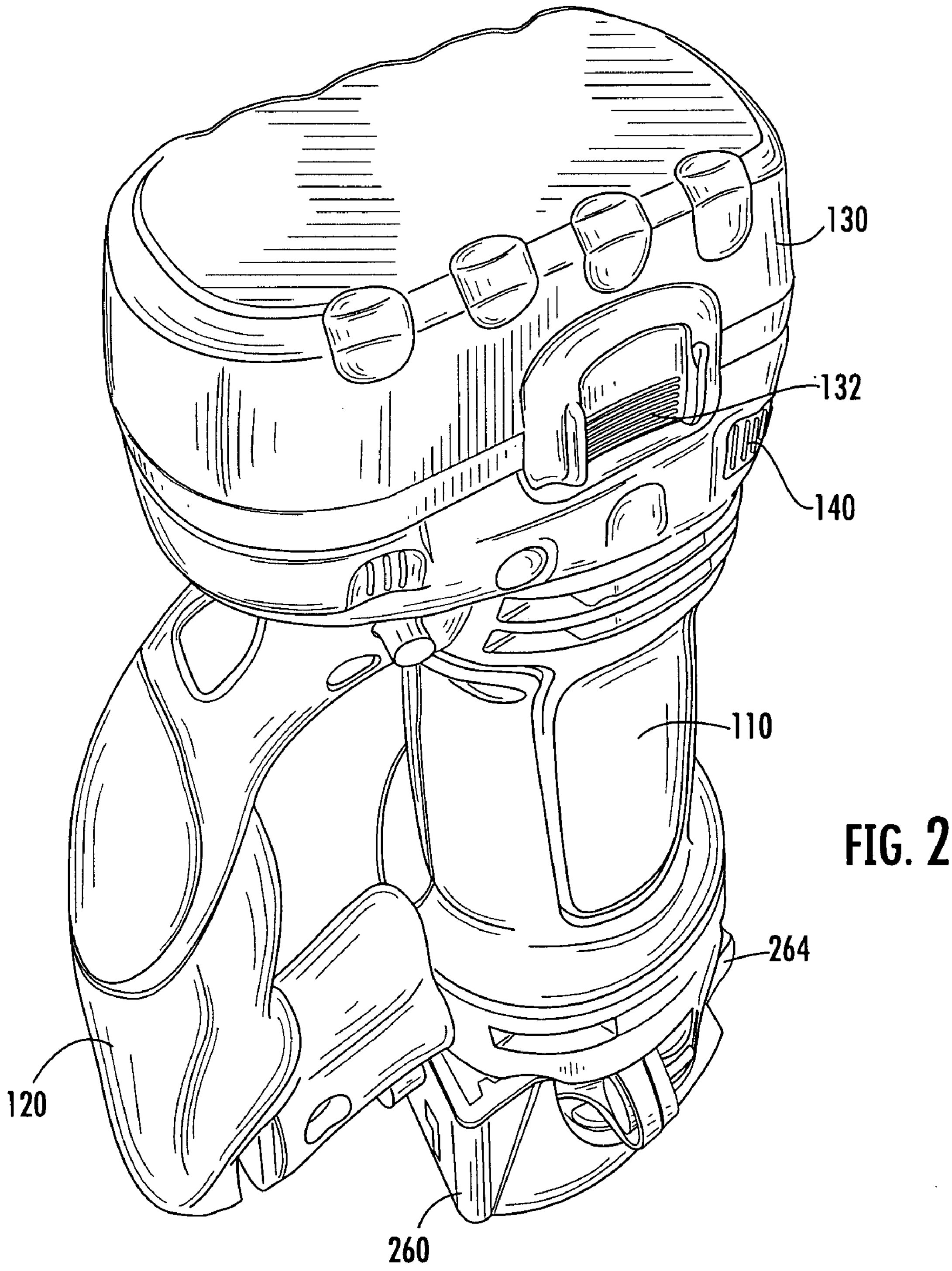
FIG. 2 is another perspective view of the hand-held power tool shown in FIG. 1.

A hand-held power tool 100 in the form of a rotary cutting tool is shown generally in FIGS. 1 and 2. It should be understood that, although the present invention will be described in detail herein with reference to the exemplary embodiment of a rotary cutting tool shown in FIGS. 1 and 2, the present invention may be applied to, and find utility in, other types of hand-held power tools as well (e.g., drills, saws, routers, etc.), and therefore, the scope of this invention is not limited to application in a rotary cutting tool 100.

The tool 100 includes a housing or casing 110 to which a handle 120 is attached. The housing 110 is made of an electrically insulating material such as hard plastic according to an exemplary embodiment. The housing 110 is generally cylindrical in shape, and may be formed as two or more molded pieces which are joined together to form the housing 110 in a conventional manner, such as using fasteners, an adhesive, welding, or a combination thereof.

A motor (not visible in FIGS. 1 and 2) is enclosed within the housing 110. The motor receives electrical power from a battery pack 130 selectively coupled to the power tool at an end thereof. A member or element 132 is provided to allow the battery pack 130 to be removed when the member 132 is depressed. According to an exemplary embodiment, the battery pack 130 includes one or more rechargeable batteries and has a fully charged voltage of between approximately 12 and 24 volts. According to a particular exemplary embodiment, the battery pack has a fully charged voltage of approximately 18.6 volts. The battery pack 130 may include any suitable type of batteries, such as nickel-metal hydride or lithium-ion batteries.

The motor is turned on and off by a member or element 140 in the form of a switch device or cap. According to an exemplary embodiment, the member 140 is pulled away from the housing 110 to activate the motor. The motor may be configured to operate at a single speed (e.g., a speed between approximately 15,000 and 30,000 rpm) or a number of speeds (e.g., speeds of 15,000 rpm, 20,000 rpm, and 30,000 rpm). In a case where the motor is capable of operating at multiple speeds, the switch may include multiple positions corresponding to the desired motor speed.

The motor of the tool 100 drives a motor shaft to which a device or mechanism 250 is coupled for securing a cutting accessory (e.g., a helical cutting tool bit or other accessory) to the motor shaft. As shown in FIG. 1, the device 250 includes a collet (not shown) and a collet nut 252 for securing a tool bit 254 to the motor shaft of the tool 100. According to an exemplary embodiment, the tool bit 254 includes a cutting edge wrapped around the axis of the bit in a helix or spiral. This cutting edge is designed such that the tool bit 254, when rotated at high speed, will cut through a workpiece in a direction substantially perpendicular to the axis of the bit.

To secure the tool bit 254 to the motor shaft, a shank of the bit is inserted into a central aperture of the collet, after which the collet nut 252 is tightened. A shaft lock 256 is used to prevent rotation of the motor shaft when the collet nut 252 is being loosened and tightened. As the collet nut 252 is tightened down on the threaded end of the shaft, the collet is compressed within the collet nut 252 between a partially closed end of the collet nut 252 and the shaft. The collet is slotted and has tapered ends such that when the collet is compressed between the collet nut 252 and the shaft, the collet is compressed radially, causing the central aperture of the collet to close tightly around the shank of the tool bit. To remove the bit from the motor shaft, the collet nut 252 is loosened until the bit can be removed easily from the central aperture of the collet.

To set the depth of cut to be made by the tool 100, an adjustable depth guide assembly 260 may be provided. The depth guide 260 is attached to the housing 110 adjacent the location where the motor shaft emerges from the housing 110.

As shown in FIG. 1, a depth guide bracket 262 is selectively attachable to the housing 110, and may be attached to the housing 110 in any conventional manner. For example, the depth guide bracket 262 may be formed to have a split collar structure and a cam closing mechanism 264 (e.g., an over-center latch) which is operated to close the collar tight around the end of the tool housing 110, and which may be operated to loosen the collar to remove the bracket 262 from the housing 110.

The depth of cut of the power tool 100 may be set by moving an extending portion 266 of the depth guide 266 in a direction along the longitudinal axis of the tool bit 254. A locking mechanism may then be used to lock the extending portion 266 in a fixed position relative to the bracket 262 to securely fix the depth guide 260 in place. The locking mechanism may be implemented as a cam lever, as a threaded nut or a screw, or as any other suitable type of device or mechanism.

The handle 120 has a generally "C" shaped configuration and includes a gripping surface 122 extending between a first end 124 and a second end 126 of the handle 120 which may be contoured in shape so that the handle 120 may be grasped comfortably in the hand by an operator of the tool 100. The gripping surface 122 is aligned substantially parallel with the axis of the housing 110. It should be understood that the term "substantially parallel" as used in this context throughout this specification means "more parallel than not." Therefore, the angle of the handle gripping surface 122 with respect to the axis of the tool 100 may be varied from exactly parallel by several degrees. The handle 120 and the gripping surface 122 may be made of a semi-rigid plastic material or any other suitable material. According to a particular exemplary embodiment, a portion of the gripping surface 122 includes an elastomeric (e.g., rubber) material provided on a surface thereof to promote better grip by a user of the tool 100.

Figure 3:
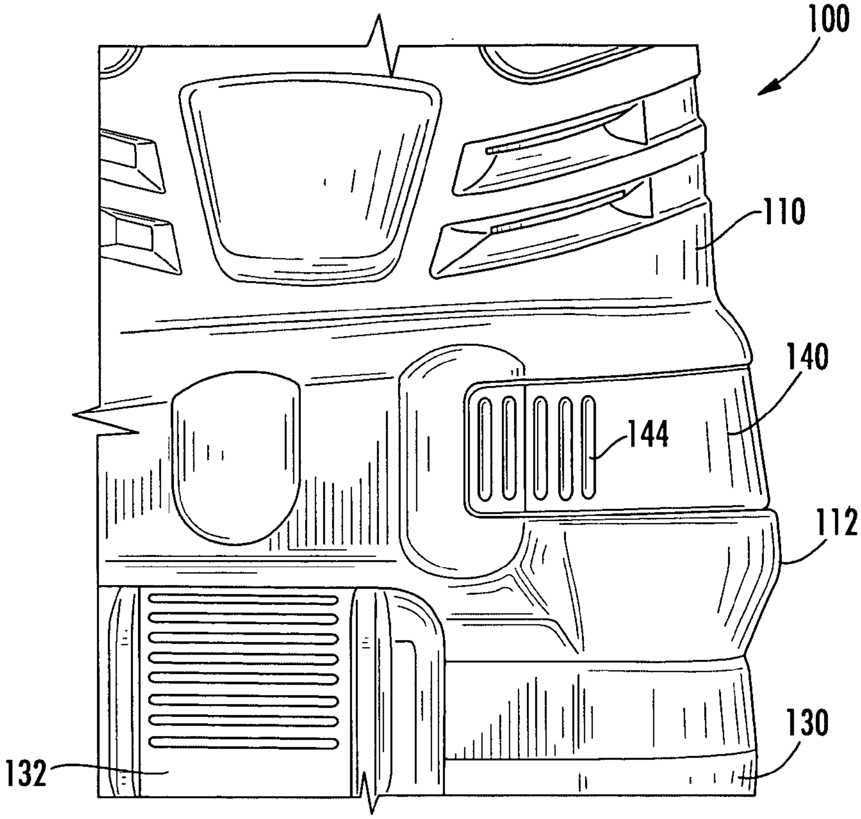
FIG. 3 is a plan view of a portion of the hand-held power tool shown in FIG. 1 according to an exemplary embodiment showing a switch in an "off" position.
Figure 4:
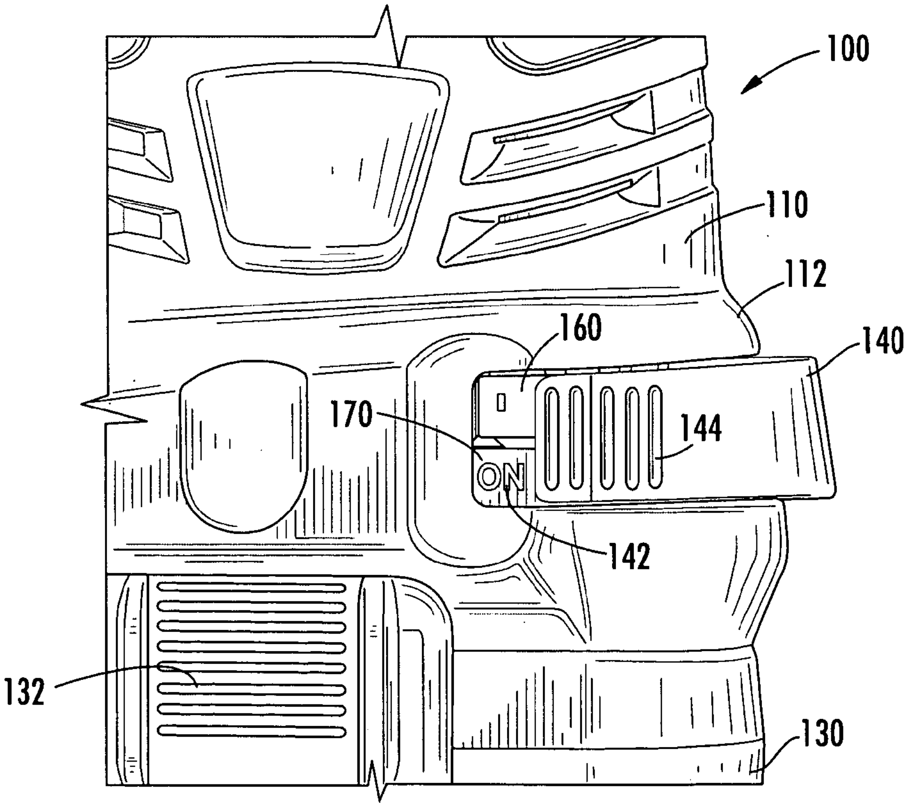
FIG. 4 is a plan view of a portion of the hand-held power tool shown in FIG. 1 according to an exemplary embodiment showing the switch in an "on" position.

FIGS. 3-9 illustrate in greater detail the features of the member 140 (e.g., the switch cap) utilized for actuating the tool 100 according to an exemplary embodiment. As illustrated in FIGS. 3 and 4, the member 140 is configured for movement between a position shown in FIG. 3 (in which the motor of the tool 100 is turned off) and a position shown in FIG. 4 (in which the motor is turned on). Markings or indicia 142 are provided on a portion of the member 140 to indicate that the member 140 is in a position in which the tool 100 is operating.

It should be noted that while FIGS. 3 and 4 illustrate a member 140 that is configured for selective movement between two positions, according to other exemplary embodiments, a member may be provided that may be selectively moveable between a greater number of positions (e.g., three or more positions, for example, to switch the motor of the tool between an off position and two different operating positions).

As shown in FIG. 3, the member 140 is slightly recessed below the surface 112 of the housing 110 of the tool 100 when the member 140 is in the "motor off" position. According to another exemplary embodiment, in this position, the member 140 may be flush or coplanar with the surface 112 or may slightly protrude or project above the surface 112. As shown in FIG. 4, when the member 140 is positioned in the "motor on" position, the member 140 extends outward (e.g., protrudes or projects beyond) from the surface 112 of the housing 110. While FIGS. 3-4 illustrate an exemplary embodiment in which an operator of the tool 100 pulls the member 140 from the body outward from the housing 110 of the tool 100 to activate the motor, according to another exemplary embodiment, a member may be provided which may be pushed by the user into or toward the housing 110 to activate the motor.

Features or elements 144 in the form of ribs, dimples, depressions, or the like may be provided on an exterior surface of the member 140 to provide enhanced grip for a user of the tool 100. The features 144 may be raised above the surface of the member 140 or may be provided as depressions or recesses in the surface of the member 140 which may be grasped by a user to move the member 140 to the desired position. The size, shape, number, and configuration of the features 144 may vary according to various exemplary embodiments, and should not be considered limited to those shown in the appended FIGURES.

Figure 6:
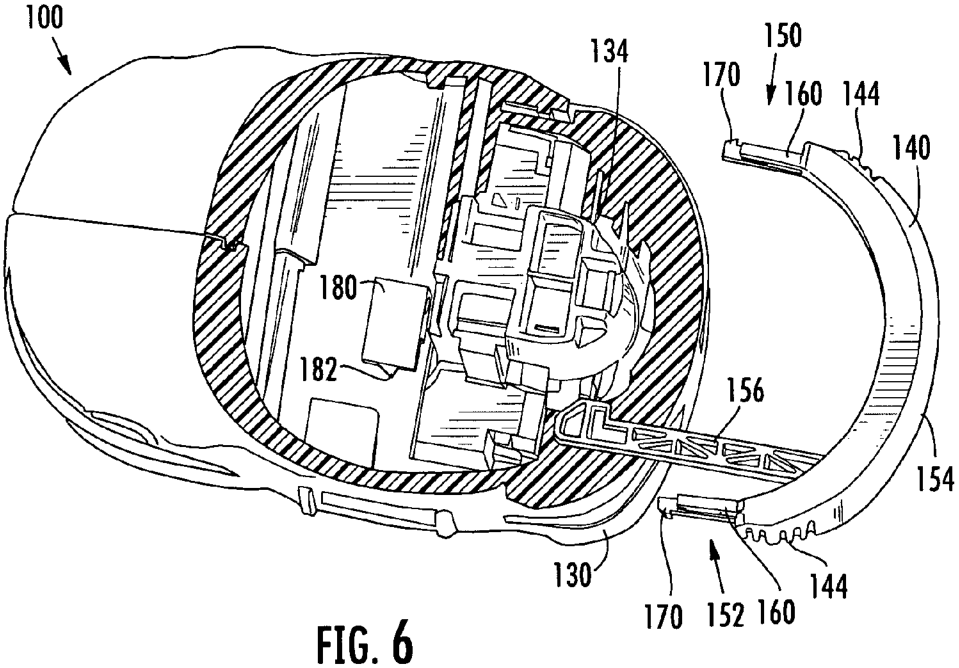
FIG. 6 is an exploded cutaway view of a portion of the power tool shown in FIG. 1.

According to an exemplary embodiment as shown in FIG. 6, the member includes a first distal end 150, a second distal end 152, a body portion or member 154 extending between the first end 150 and the second end 152, and a member or element 156 in the form of an extension (e.g., a cantilever beam) extending from the body 154 into the body of the tool 100. As shown in FIG. 6, the member 140 is generally "C" or "U" shaped to follow the profile of the housing 110 of the tool 100. According to other exemplary embodiments, a member may be provided that has a different shape, size, and/or configuration than that shown in FIG. 6. For example, according to another exemplary embodiment in which a power tool is provided that has a generally rectangular cross-sectional shape in the area where the member is to be provided, the member may not be provided with a "C" or "U" shape.

Figure 5:
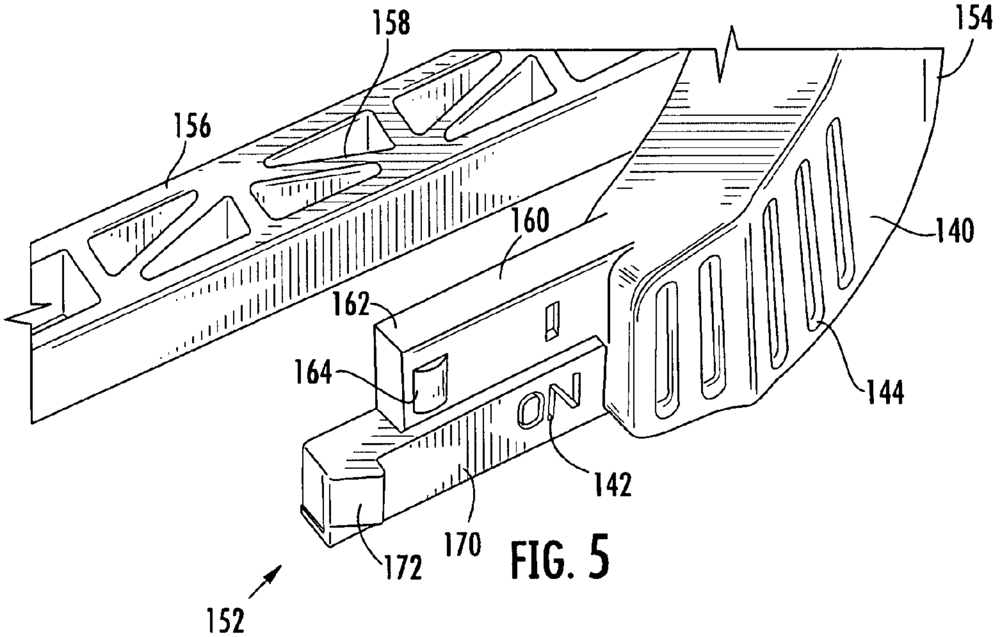
FIG. 5 is a perspective view of a portion of the switch shown in FIGS. 3 and 4.

According to an exemplary embodiment as shown in FIGS. 5-6, each of the ends 150 and 152 of the member 140 includes a first member or element 160 in the form of an arm or extension and a second member of element 170 in the form of an arm or extension. As shown in FIG. 5, the arm 170 is longer than the arm 160 (i.e., the arm 170 extends further than the arm 160). According to an exemplary embodiment, the members 160 and 170 are relatively flexible and are made of a polymeric material such as hard plastic. According to other exemplary embodiments, the members 160 and 170 may be made of other materials such as spring steel.

As shown in FIG. 5, the arm 170 includes a feature 172 that provides a "snap-fit" for the arm 170 to retain the member 140 in the tool 100. That is, the ends 150 and 152 of the member 140 are inserted into the housing 110 of the tool 100 until the feature 172 of the arm 170 engages a feature (not shown) provided within the housing 110. Because the feature 172 provides a one-time snap fit for the member 140, once the feature 172 engages the feature provided within the housing, the member may not be removed from the housing 110 of the tool 100. In this manner, the member 140 is prevented from accidental or intentional removal from the tool. One advantageous feature of such a feature is that the member 140 may be relatively simply and securely coupled to the power tool during the tool assembly process and may be retained in the tool thereafter in a relatively simple and efficient manner. The one-time snap fit feature is intended to allow the member 140 to remain coupled to the tool even in situations where the tool is dropped or otherwise subjected to an impact.

Figure 9:
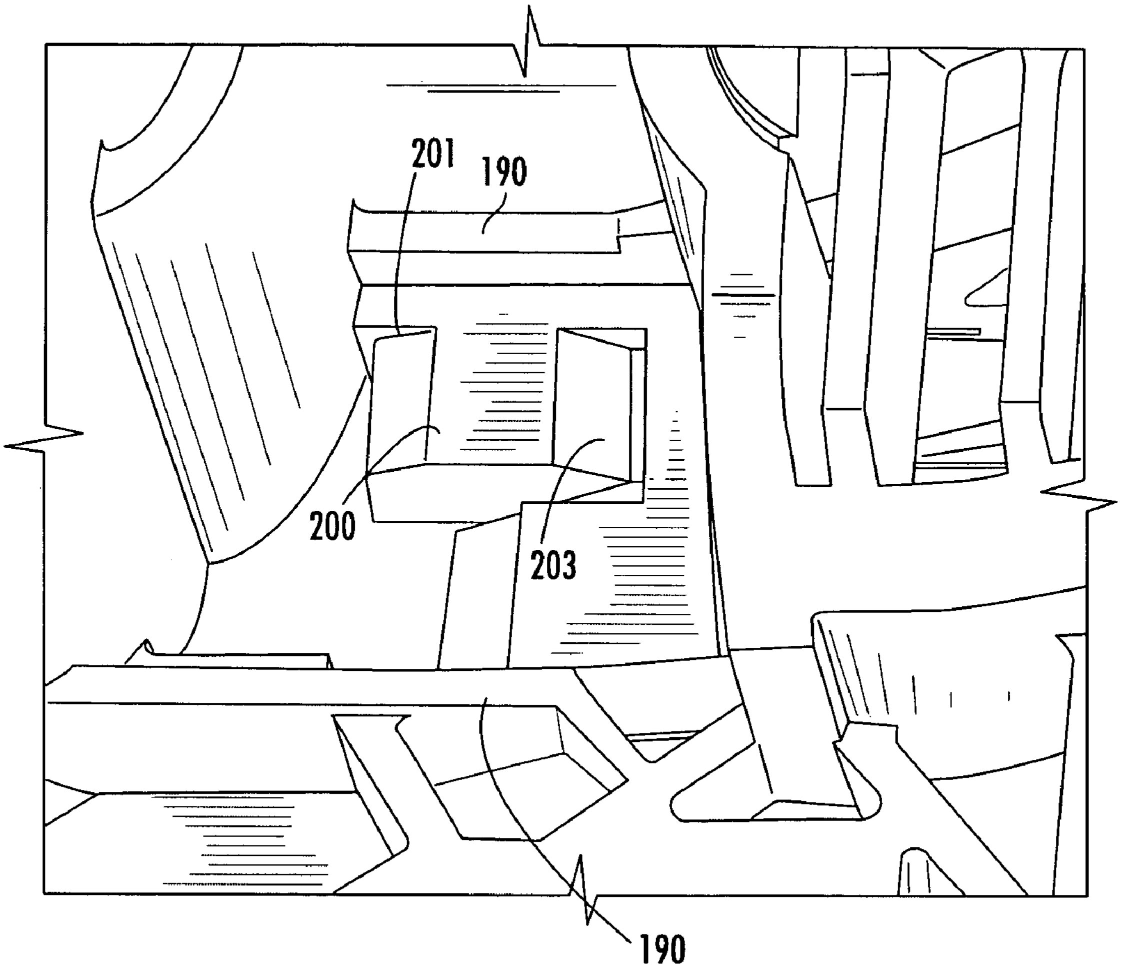
FIG. 9 is a partial cutaway view of the power tool shown in FIG. 1 according to an exemplary embodiment.
Figure 10:
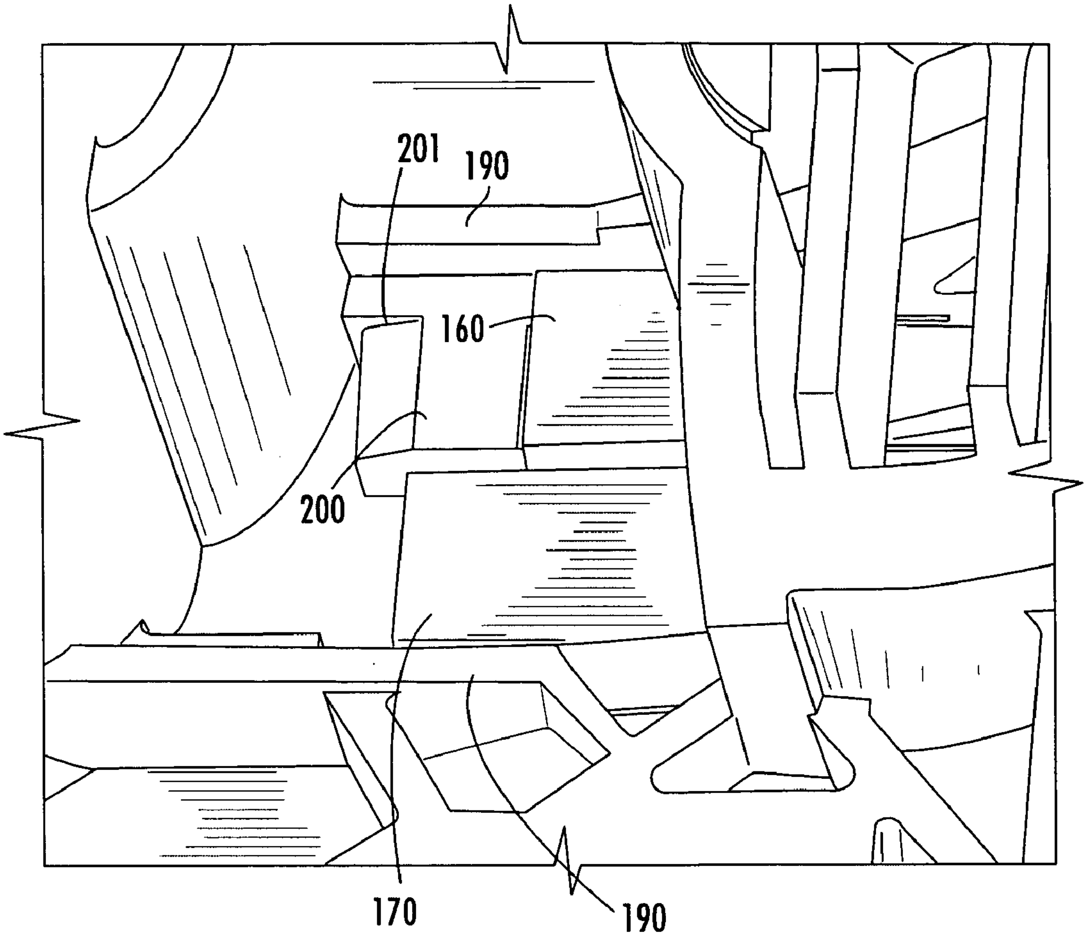
FIG. 10 is a partial cutaway view of the power tool shown in FIG. 1 showing a portion of the switch according to an exemplary embodiment.

As shown in FIG. 5, the member 160 includes a feature 164 in the form of a detent that is configured for providing positive feedback to an operator of the tool 100 when the member 140 is properly positioned (e.g., the operator will receive feedback when the member 140 is moved to the "on" position to indicate that the member 140 has been moved far enough to activate the tool). The feature 164 may provide feedback to the operator when it contacts a feature (e.g., a notch or depression, rib, protrusion, groove, etc.) provided in a portion 200 of the housing 110 (FIG. 9). For example, as shown in FIG. 9, a first depression 201 is provided for receiving the feature 164 when the member 140 is provided in the off position, and a second depression 203 is provided for receiving the feature 164 when the member 140 is provided in the on position. FIG. 10 illustrates the member 140 in the on position, in which the feature 164 is received in the depression 203 (obscured by the member 160).

As shown in FIG. 5, the feature 164 may be provided as integrally formed with the member 160. According to other exemplary embodiments, a feature similar to the feature 164 may be provided on a separate structure coupled to the member 160. For example, according to an exemplary embodiment, the feature 164 is provided as a part of a member or element (e.g., a clip or cap) that is coupled or attached to the member 160. The clip may be made from any suitable material, such as a metal or other material intended to reduce the potential wear to the feature 164. Also, it should be noted that according to various exemplary embodiments, the size, shape, and/or configuration of the feature 164 may differ from that shown in the appended FIGURES.

The detent system is configured such that it is easier for an operator to turn the tool off than to turn it on, thus reducing the occurrence of accidental activation of the motor. For example, the angle of ramp defining the depression 201 may have a different slope than that used to form the depression 203 (e.g., the angle of the ramp defining the depression 201 may be approximately 25 degrees, while the angle of the ramp defining the depression 203 may be approximately 20 degrees). In this manner, the feature 164 acts to reduce or prevent the occurrence of motor activation in the event that the tool 100 is dropped or bumped.

To assist in guiding the members 160 and 170 within the housing 110 of the tool 100, ribs or guides 190 (FIG. 9) may be provided to define a path in which the members 160 and 170 may travel. According to an exemplary embodiment, the guides 190 act both to define the pathway for the members 160 and 170 and also to provide enhanced structural rigidity for the housing 110. According to another exemplary embodiment, the guides 190 may be provided solely to define the path in which the members 160 and 170 travel during use in the tool 100.

Figure 7:
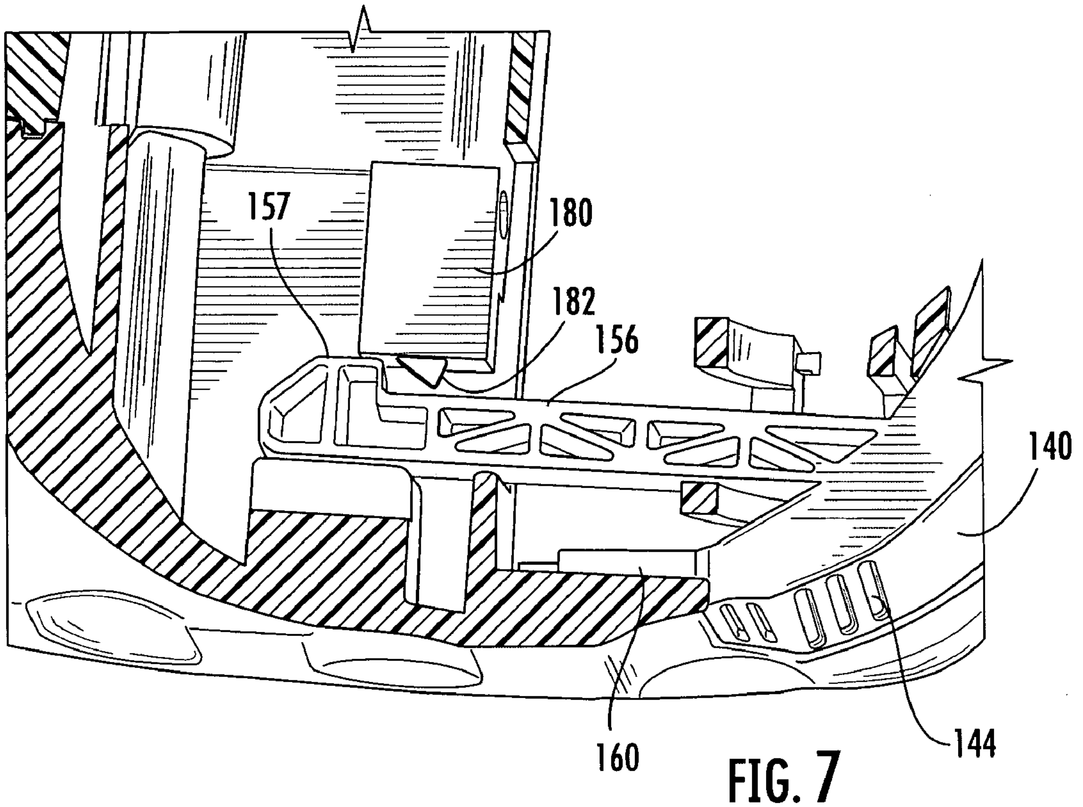
FIG. 7 is a partial cutaway view of a portion of the power tool shown in FIG. 1 showing the switch in an "off" position.
Figure 8:
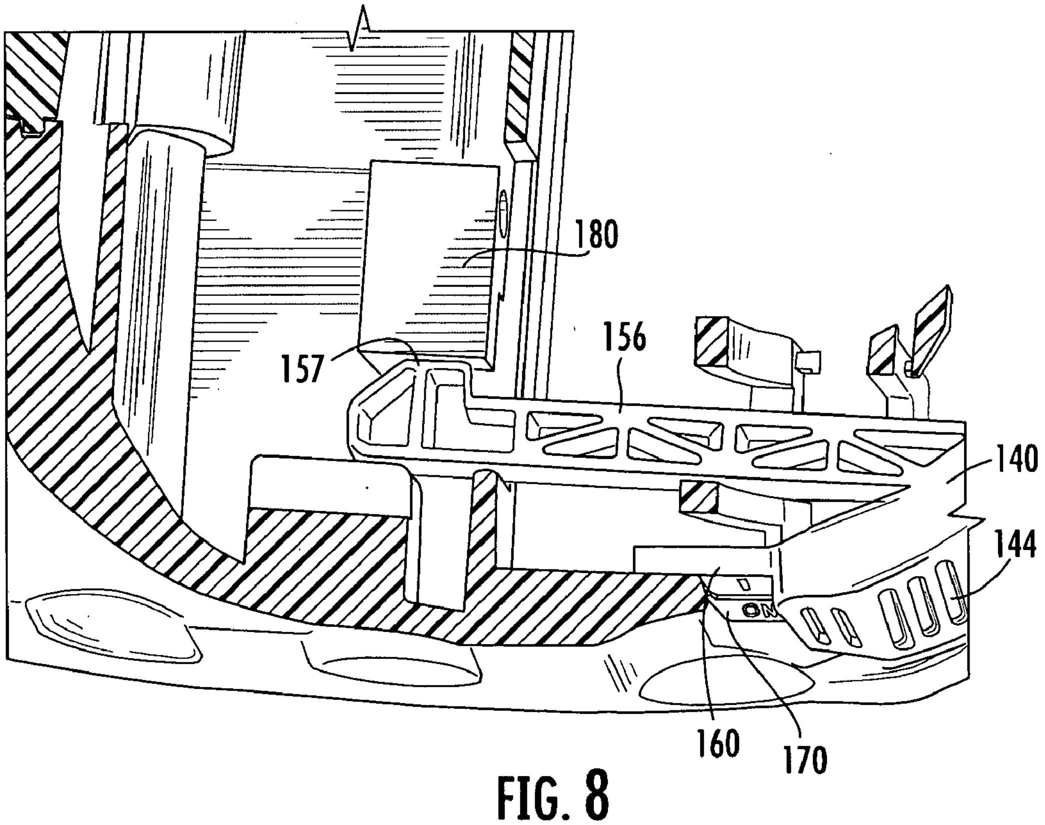
FIG. 8 is a partial cutaway view of a portion of the power tool shown in FIG. 1 showing the switch in an "on" position.

A member or element 156 in the form of an arm or extension (e.g., a cantilever beam) is provided which extends from the body 154 of the member 140. The member 156 is configured for selectively actuating a switch 180 provided within the housing 110 of the tool 100, as shown in FIGS. 7-8 (which may be a mechanical or electrical switch according to various exemplary embodiments). A portion 157 of the member 156 has a shape that is configured to engage or contact (e.g., actuate) a switch pawl 182 coupled to the switch 180. As shown in FIGS. 7 and 8, when the member 140 is in the position shown in FIG. 3 (e.g., the "motor off" position), the portion 157 of the member 156 is not in contact with the switch pawl 182; accordingly, in this position, the switch 180 is not activated by the member 156. When an operator of the tool 100 pulls the member 140 such that it is moved to the "motor on" position, as shown in FIG. 4, the portion 157 of the member 156 contacts the switch pawl 182 to actuate the switch 180 and to thus activate the motor of the tool 100.

As shown in FIG. 6, a post or terminal 134 of the battery pack 130 is provided between the switch 180 and the member 140. The member 156 extending from the member 140 is configured to allow actuation of the switch 180 by movement of the member 140 despite the fact that the terminal 134 is provided between these items. In this manner, the "C" or "U" shaped member 140 may straddle the battery terminal 134 while allowing a user to actuate the switch 180 which is provided beyond (i.e., in front of) the battery terminal 134.

The size, shape, and configuration of the member 156 extending from the member 140 may vary according to various exemplary embodiments. As shown in FIGS. 5-6, the member 156 includes a plurality of ribs 158 which forms the body of the member 156. One advantageous feature of providing a member 156 having such a configuration is that less material is required than if a solid member were provided. According to other exemplary embodiments, a solid member or a member having a different configuration may be utilized.

Those reviewing this disclosure will recognize the various advantageous features may be provided by a member such as the member 140 shown in FIGS. 3-9. For example, the member may include a one time snap feature that allows for the relatively efficient and simple assembly but that prevents the user from intentionally or accidentally removing the member from the tool. The member also includes a detent system independent of the one-time snap feature that provides feedback to an operator of the tool regarding proper positioning of the member. Such detents may be made of a material that reduces the occurrence of wear during the use of the tool.

It is important to note that the construction and arrangement of the power tool and switch as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., the member 156 may be produced separately and coupled to the body portion 154 of the member 140), the position of elements may be reversed or otherwise varied (e.g., the members 160 and 170 on each of the ends of the member 140 may be reversed), and the nature or number of discrete elements or positions may be altered or varied (e.g., the member 160 may include a plurality of detents). Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A power tool comprising:

a housing having a motor provided therein;

a switch provided within the housing for activating the motor; and a member configured for movement between a first position in which the motor is operating and a second position in which the motor is not operating, the member comprising a first end retained in the housing at a first location, a second end retained in the housing at a second location, a body portion extending between the first end and the second end, and a beam extending from the body into the housing for selectively actuating the switch;

wherein the first end and the second end each comprise a first arm and a second arm, the first arm comprising a feature for retaining the end in the housing and the second arm comprising a feature for providing feedback to a user regarding the position of the member.

2. The power tool of claim 1, wherein the second arm comprises a metal clip comprising a detent for providing feedback to the user.

3. The power tool of claim 1, wherein the body portion protrudes from the housing in the first position and is recessed in the housing in the second position.

4. The power tool of claim 1, wherein the power tool comprises a battery for providing power to a motor.

5. The power tool of claim 1, wherein the member is a switch cap.

6. The power tool of claim 1, wherein an outer surface of the member comprises grip features for a user of the power tool.

7. The power tool of claim 1, wherein the grip features comprise at least one feature selected from the group consisting of dimples, ribs, and grooves.

8. The power tool of claim 1, wherein the body portion, first end, and second end of the member form a “C” shape.

9. A power tool comprising:

a housing having a motor provided therein;

a switch provided within the housing for activating the motor;

a member configured for movement between a first position in which the motor is operating and a second position in which the motor is not operating, the member comprising a first end retained in the housing at a first location, a second end retained in the housing at a second location, a body portion extending between the first end and the second end, and a beam extending from the body into the housing for selectively actuating the switch; and a battery for providing power to the motor;

wherein the battery comprises a battery post provided between the switch and the body portion, and wherein the beam extends past the battery post for selectively actuating the switch.

10. The power tool of claim 9, wherein the member comprises at least one feature for providing positive feedback to an operator regarding the position of the member.

11. The power tool of claim 10, wherein the at least one feature comprises a detent.

12. The power tool of claim 9, wherein the first end comprises a feature for retaining the first end in the housing at the first location and the second end comprises a feature for retaining the second end in the housing at the second location.

13. The power tool of claim 9, wherein the first end and the second end each comprise a first arm and a second arm, the first arm comprising a feature for retaining the end in the housing and the second arm comprising a feature for providing feedback to a user regarding the position of the member.

14. A power tool comprising:

a switch cap for actuating a switch provided within a housing of a power tool, the switch cap comprising a first end portion; a second end portion; a center portion; and means for engaging a switch provided within the power tool extending from the center portion;

wherein the first end portion and the second end portion each include a first arm and a second arm, the first arm comprising means for preventing the switch cap from being removed from the power tool and the second arm comprising means for providing feedback regarding the position of the switch cap.

15. The power tool of claim 14, wherein the means for providing feedback comprises a detent.

16. The power tool of claim 14, wherein the center portion of the switch cap is flush with or recessed in the housing of the power tool when the tool is turned off.

17. The power tool of claim 14, wherein the center portion of the switch cap protrudes from the housing of the power tool when the tool is turned on.

18. The power tool of claim 14, wherein the first arm is longer than the second arm.

19. The power tool of claim 14, wherein the means for engaging a switch comprises a beam.

20. The power tool of claim 19, wherein the beam comprises a feature for contacting a switch pawl coupled to the switch.

21. A power tool comprising:

housing having a motor provided therein;

a battery for providing power to the motor; and a system for activating the motor comprising a switch provided within the housing and a member for actuating the switch;

wherein the member comprises a body portion, an element extending from the body portion for actuating the switch, a first end, and a second end;

wherein each of the first end and the second end comprise a first arm and a second arm, the first arm comprising a feature for preventing the switch cap from being removed from the power tool and the second arm comprising a feature for providing feedback regarding the position of the switch cap.

22. The power tool of claim 21, wherein the second arm comprises a metal cap and the feature for providing feedback is a detent provided in the metal cap.

23. The power tool of claim 21, wherein the first arm is longer than the second arm.

24. The power tool of claim 23, wherein the first arm and the second arm are flexible.

25. The power tool of claim 21, wherein the body portion comprises grip features.

26. The power tool of claim 21, wherein the member is configured for selective movement between a first position in which the motor is activated and a second position in which the motor is deactivated.

27. The power tool of claim 21, wherein in the first position the body portion protrudes from the housing and in the second position the body portion is flush with or recessed in the housing.

* * * * *

UNITED STATES PATENT AND TRADEMARK OFFICE

CERTIFICATE OF CORRECTION

PATENT NO. : 7,261,166 B2 
APPLICATION NO. : 11/229294
DATED : August 28, 2007
INVENTOR(S) : Brad M. Baber and David Clarke It is certified that error appears in the above-identified patent and that said Letters Patent is hereby corrected as shown below:

Column 9;

Line 12: --a-- should be inserted before "housing"

Signed and Sealed this

Twenty-fifth Day of December, 2007

JON W. DUDAS
*Director of the United States Patent and Trademark Office*